United States Patent
Suzuki et al.

(10) Patent No.: US 11,332,616 B2
(45) Date of Patent: May 17, 2022

(54) ETHYLENEIMINE POLYMER SOLUTION AND METHOD FOR PRODUCING SAME

(71) Applicant: Nippon Shokubai Co., Ltd., Osaka (JP)

(72) Inventors: Seiichi Suzuki, Kanagawa (JP); Takashi Saito, Kanagawa (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 16/639,894

(22) PCT Filed: Aug. 23, 2018

(86) PCT No.: PCT/JP2018/031202
§ 371 (c)(1),
(2) Date: Feb. 18, 2020

(87) PCT Pub. No.: WO2019/039556
PCT Pub. Date: Feb. 28, 2019

(65) Prior Publication Data
US 2020/0362168 A1 Nov. 19, 2020

(30) Foreign Application Priority Data
Aug. 24, 2017 (JP) .............................. JP2017-161466

(51) Int. Cl.
| C08L 79/02 | (2006.01) |
| C02F 1/56 | (2006.01) |
| C08G 73/02 | (2006.01) |
| C09J 11/08 | (2006.01) |
| D21H 21/10 | (2006.01) |

(52) U.S. Cl.
CPC .............. *C08L 79/02* (2013.01); *C02F 1/56* (2013.01); *C08G 73/0213* (2013.01); *C09J 11/08* (2013.01); *D21H 21/10* (2013.01)

(58) Field of Classification Search
CPC ....... C08L 79/02; C02F 1/56; C08G 73/0213; C09J 11/08; D21H 21/10
See application file for complete search history.

(56) References Cited

U.S. PATENT DOCUMENTS

| 3,498,932 A * | 3/1970 | Coker | C08G 73/0213 528/392 |
| 4,614,762 A * | 9/1986 | Marans | C08G 12/46 525/414 |
| 5,643,456 A * | 7/1997 | Smith | B01D 61/16 210/651 |
| 5,977,293 A | 11/1999 | Steuerle et al. | |
| 6,444,769 B2 * | 9/2002 | Suzuki | C08G 73/0213 526/258 |
| 6,576,086 B1 * | 6/2003 | Ettl | C08F 8/44 162/164.3 |
| 6,929,759 B2 * | 8/2005 | Fruh | C02F 1/5245 210/728 |
| 7,431,845 B2 * | 10/2008 | Manek | B01D 17/047 210/708 |
| 8,658,702 B2 * | 2/2014 | Diallo | C02F 1/42 514/772.3 |
| 2001/0039318 A1 | 11/2001 | Suzuki et al. | |
| 2005/0040108 A1 * | 2/2005 | Jay | C22B 15/0089 210/638 |
| 2010/0179293 A1 * | 7/2010 | Hintzer | C08F 6/22 526/255 |
| 2016/0185906 A1 | 6/2016 | Suzuki et al. | |
| 2017/0247511 A1 | 8/2017 | Suzuki et al. | |

FOREIGN PATENT DOCUMENTS

| EP | 2743288 A1 * | 6/2014 | ......... C08G 73/0213 |
| EP | 2743288 A1 | 6/2014 | |
| JP | 2000-501757 A | 2/2000 | |
| JP | 2001-288265 A | 10/2001 | |
| JP | 2012-214597 A | 11/2012 | |
| KR | 20080112321 A * | 12/2008 | ................ C02F 1/56 |
| WO | WO-0134856 A1 * | 5/2001 | ............. C22B 11/04 |
| WO | 2015/020012 A1 | 2/2015 | |
| WO | 2016/059728 A1 | 4/2016 | |

OTHER PUBLICATIONS

BASF, Technical Information, Lupasol® types (2010) (Year: 2010).*

(Continued)

*Primary Examiner* — Alexander R Pagano
(74) *Attorney, Agent, or Firm* — Lucas & Mercanti, LLP

(57) ABSTRACT

There is provided an ethyleneimine polymer (solution) capable of expressing excellent properties when used in such usages as, for example, coagulants for wastewater, papermaking chemicals such as freeness improvers and the like, enzyme immobilization agents, and adhesion improvers (for example, adhesion promoters for extrusion laminate (anchor coating agent)).

To solve the above object, there is provided an ethyleneimine polymer solution including an ethyleneimine polymer and water, wherein a weight average molecular weight (Mw) of the ethyleneimine polymer is 200,000 or more, the weight average molecular weight (Mw) being measured based on pullulan by gel permeation chromatography (GPC), and a ratio of a component having a weight average molecular weight (Mw) of 30,000 or more is 60 mass % or more with respect to 100 mass % of a total amount of the ethyleneimine polymer.

18 Claims, 1 Drawing Sheet

(56) References Cited

OTHER PUBLICATIONS

Hawley's Condensed Chemical Dictionary, p. 1227 (16th ed., 2016, R.J. Larrañaga ed.) (Year: 2016).*
D. Fischer et al., 13 Bioconjugate Chem. 1124-1133 (2002) (Year: 2002).*
M. Glodde et al., 7 Biomacromolecules, 347-356 (2006) (Year: 2006).*
M. Litt et al., 30 Journal of Polymer Science: Part A Polymer Chemistry, 779-786 (1992) (Year: 1992).*
PCT, International Search Report for the corresponding application No. PCT/JP2018/031202, dated Nov. 6, 2018, with English Translation (3 pages).
PCT, Written Opinion of the International Searching Authority for the corresponding application No. PCT/JP2018/031202, dated Sep. 25, 2018, with English Translation (12 pages).
EPO, Extended European Search Report for the corresponding European patent application No. 18847644.4, dated Jul. 1, 2021.
"Lupasol types," BASF The Chemical Company, published Sep. 30, 2010, pp. 1-10.
CNIPA, Office Action for the corresponding Chinese patent application No. 201880053795.9, dated Nov. 3, 2021, with English translation.

* cited by examiner

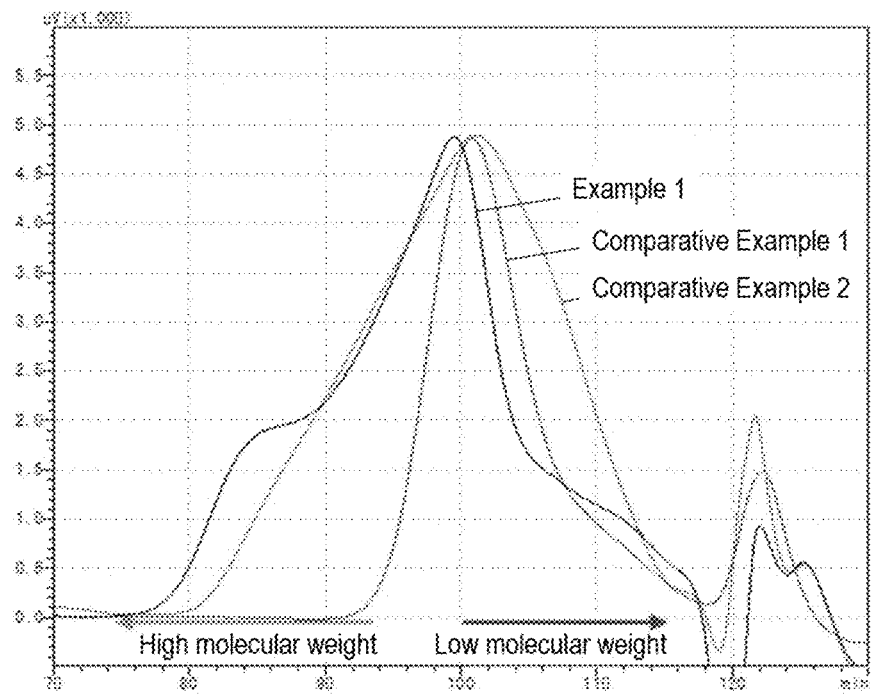

ETHYLENEIMINE POLYMER SOLUTION AND METHOD FOR PRODUCING SAME

CROSS REFERENCE TO RELATED APPLICATION

This Application is a 371 of PCT/JP2018/031202 filed on Aug. 23, 2018 which, in turn, claimed the priority of Japanese Patent Application No. 2017-161466 filed on Aug. 24, 2017, both applications are incorporated herein by reference.

TECHNICAL FIELD

The present invention relates to an ethyleneimine polymer solution and a method for producing the same.

BACKGROUND ART

Hitherto, ethyleneimine polymers have been widely utilized in the fields of paper processing agents, adhesives, pressure sensitive adhesives, paints, inks, textile treatment agents, coagulative separating agents, cosmetics, toiletries, dispersing agents, and the like. Here, it is difficult to conduct the polymerization of ethyleneimine while controlling the polymerization temperature, the molecular weight, the branch structure, and the like since ethyleneimine is highly reactive. Thus, conventionally, various methods for polymerizing ethyleneimine have been proposed.

For example, an ethyleneimine polymer is produced by polymerizing ethyleneimine in the presence of a polymerization initiator. In case where the polymerization is carried out in the absence of a solvent, a viscosity problem would make it difficult to obtain the ethyleneimine polymer with a high polymerization degree. For this reason, in order to obtain an ethyleneimine polymer with a high polymerization degree, the polymerization reaction is carried out in an aqueous solvent, thereby obtaining the ethyleneimine polymer with a high molecular weight in a form of an aqueous solution thereof.

For example, as a technology for usage as an adhesion promoter for film printing ink, in which an ink composition with polyvinyl butyral as a binder is prepared for improving adhesion property to a film, the pamphlet of WO 2015/020012 discloses a technology in which ethyleneimine is polymerized with 1.0 to 40 mass % of water with respect to 100 mass % of ethyleneimine in the presence of 0.3 to 5 mass % of a catalyst with respect to 100 mass % of ethyleneimine under a temperature condition in a range of 50 to 150° C., thereby obtaining an ethyleneimine polymer in a form of an aqueous solution with a high molecular weight (Mn≥13,000) and a dispersibility (Mw) controlled within a range of 1.4 to 3.0.

SUMMARY OF INVENTION

Technical Problem

As the usage of the ethyleneimine polymer, for example, enzyme immobilization agents, adhesion improvers (for example, adhesion promoters for extrusion laminate (anchor coating agents)), and the like are known apart from the adhesion promoter for film printing ink. However, studies conducted by the present inventors found that there is such a problem that satisfactory properties cannot be attained when such an ethyleneimine polymer as described in the pamphlet of WO 2015/020012 is used for these usages.

In view of this, an object of the present invention is to provide an ethyleneimine polymer (solution) capable of expressing excellent properties when used in such usages as, for example, coagulants for wastewater, papermaking chemicals such as freeness improvers and the like, enzyme immobilization agents, and adhesion improvers (for example, adhesion promoters for extrusion laminate (anchor coating agent)).

Solution to Problem

The present inventors diligently studied to solve the above-described problem. As a result, the present inventors have found that an ethyleneimine polymer solution capable of solving the problems can be obtained by preparing the ethyleneimine polymer solution with a smaller low molecular weight component content but with a greater high molecular weight component content, and the present inventors also have found, for the first time, a production method for producing such an ethyleneimine polymer solution. Thus, the present invention has been completed.

That is, an aspect of the present invention relates to an ethyleneimine polymer solution including an ethyleneimine polymer and an aqueous solvent. The ethyleneimine polymer solution is characterized in that a weight average molecular weight (Mw) of the ethyleneimine polymer is 200,000 or more, the weight average molecular weight (Mw) being measured based on pullulan by gel permeation chromatography (GPC), and a ratio of a component having a weight average molecular weight (Mw) of 30,000 or more is 60 mass % or more with respect to 100 mass % of a total amount of the ethyleneimine polymer.

In addition, another aspect of the present invention relates to a method for producing the above described ethyleneimine polymer solution, for example. The production method includes a synthesis step for synthesizing an ethyleneimine polymer by polymerizing ethyleneimine in an aqueous solvent. Then, the synthesis step is characterized by including polymerizing ethyleneimine in a reaction system including a polyamine compound whose weight average molecular weight is in a range of 1,000 to 100,000 and whose dispersibility is 10.0 or less, and an organic compound having two or more halogen elements in its molecule.

BRIEF DESCRIPTION OF DRAWINGS

FIG. 1 is a graph showing results of gel permeation chromatography (GPC) measurements of molecular weights of ethyleneimine polymers contained in ethyleneimine polymer aqueous solutions obtained in Example 1, Comparative Example 1 and Comparative Example 2, described later.

DESCRIPTION OF EMBODIMENTS

An aspect of the present invention is an ethyleneimine polymer solution including an ethyleneimine polymer and an aqueous solvent, wherein a weight average molecular weight (Mw) of the ethyleneimine polymer is 200,000 or more, the weight average molecular weight (Mw) being measured based on pullulan by gel permeation chromatography (GPC), and a ratio of a component having a weight average molecular weight (Mw) of 30,000 or more is 60 mass % or more with respect to 100 mass % of a total amount of the ethyleneimine polymer.

The ethyleneimine polymer solution with such a configuration can express excellent properties when used in usages such as enzyme immobilization agents or adhesion improvers (for example, anchor coating agents for laminate films), for example.

The mechanism how the ethyleneimine polymer solution according to the present invention can express the excellent properties when used for example in the usages has not been understood thoroughly. However, it is deduced that the relatively greater high molecular weight component content results in a greater intermolecular aggregation force, which contributes to the expression of the excellent properties in the usages. Incidentally, this mechanism is one deduced, and the present invention is not limited by the mechanism at all.

Hereinafter, preferred embodiments of the invention will be described. Incidentally, the invention is not limited to the following embodiments.

In addition, in the present Description, the term "X to Y" to indicate a range means "X or more and Y or less", the term "weight" and the term "mass" are regarded as synonymous with each other. In addition, the operations and the measurement of physical properties and the like are conducted under a condition of room temperature (20 to 25° C.)/relative humidity of from 40 to 50% unless otherwise stated.

<Ethyleneimine Polymer Solution>

The ethyleneimine polymer solution includes an ethyleneimine polymer and an aqueous solvent. Hereinafter, these components will be described in detail.

<Ethyleneimine Polymer>

An ethyleneimine polymer is a water-soluble polymer obtained by polymerizing ethyleneimine and is a polymer compound having a branch structure such as a primary amine, a secondary amine, or a tertiary amine. The ethyleneimine polymer is highly reactive as compared to other polymer compounds, and may be chemically modified as appropriate for the application, by being subjected to a reaction with an aldehyde compound, an alkyl halide compound, an isocyanate compound, an epoxy compound such as epichlorohydrin, a cyanamide compound, a guanidine compound, urea, a carboxylic acid compound, a cyclic acid anhydride compound, an acyl halide compound, or the like.

The ethyleneimine polymer according to the present aspect is characterized in that the value of the weight average molecular weight (Mw) is relatively large. More specifically, it is essential that the weight average molecular weight (Mw) of the ethyleneimine polymer according to the present aspect be 200,000 or more as a value based on pullulan measured by gel permeation chromatography (GPC). If the value of the weight average molecular weight (Mw) of the ethyleneimine polymer is less than 200,000, there will be a problem that satisfactory properties cannot be expressed when used in various usages such as adhesion improvers. Incidentally, the weight average molecular weight (Mw) of the ethyleneimine polymer according to the present aspect is preferably 400,000 or more, more preferably 450,000 or more, further preferably 500,000 or more, still further preferably 550,000 or more, still yet further preferably 600,000 or more, especially preferably 650,000 or more, or most preferably 700,000 or more. An upper limit of the weight average molecular weight (Mw) of the ethyleneimine polymer is not particularly limited, but usually 1,000,000 or less.

Furthermore, the ethyleneimine polymer according to the present aspect is also characterized in that content ratio of components relatively greater in molecular weight is high. More specifically, it is essential for the ethyleneimine polymer according to the present aspect in that a ratio of components with a weight average molecular weight (Mw) of 30,000 or more (which may be referred to as "high molecular weight component ratio" in this Description), should be 60 mass % or more with respect to 100 mass % of the total amount of the ethyleneimine polymer. If this high molecular weight component ratio is less than 60 mass %, there will be a problem that satisfactory properties cannot be expressed when used in various usages such as adhesion improvers. Incidentally, the high molecular weight component ratio in the ethyleneimine polymer according to the present aspect is preferably 65 mass % or more, more preferably 67 mass % or more, further preferably 68 mass % or more, still further preferably 69 mass % or more, still yet further preferably 70 mass % or more, especially preferably 74 mass % or more, and most preferably 75 mass % or more. An upper limit of the weight average molecular weight (Mw) of the ethyleneimine polymer is not particularly limited, but usually 90 mass % or less.

Each of the values of the weight average molecular weight (Mw) and the high molecular weight component ratio in the ethyleneimine polymer according to the present aspect can be measured by a well-known method by using gel permeation chromatography (GPC) using pullulan as a standard substance. As the GPC measurement conditions, the present invention adopts the following conditions.

Measuring Device; Shimadzu Corporation

Column used; SHODEX OHpak SB-807HQ (×2 columns) and SB-806M/HQ (×2 columns), made by SHOWA DENKO K.K.

Elusion Solution; preparation of 0.5 mol %—Sodium nitrate and 0.5 mol %—Acetic acid Standard Substance; Pullulan P-82 (made by Wako Pure Chemical Corporation)

Detector; differential refractometer (made by Shimadzu Corporation)

(Aqueous Solvent)

A solvent component of the ethyleneimine polymer solution according to the present invention is an aqueous solvent. The aqueous solvent usually contains water as its main component. More specifically, a percentage of water in the aqueous solvent is usually 50 mass % or more, preferably 80 mass % or more, more preferably 90 mass % or more, further preferably 95 mass % or more, especially preferably 98 mass % or more, or most preferably 100 mass %. Incidentally, in the case where the aqueous solvent contains a solvent component other than water, it is preferably that the other solvent component be preferably a water-soluble solvent. Examples of such a water-soluble solvent may include methanol, ethanol, isopropanol, butanol, acetone, methylethylketone, dimethylformamide, methyl cellosolve, tetrahydrofuran, and the like. Among them, it is preferable to use a resin-insoluble solvent, like an alcohol solvent, such as methanol, ethanol, isopropanol, or butanol. However, it is preferable that the aqueous solvent is water only, as described above.

A solid content (resin content) concentration of the ethyleneimine polymer according to the present invention is preferably in a range of 20 to 60 mass %, and more preferably in a range of 22 to 40 mass %, and further preferably in a range of 25 to 35 mass %. In other words, the amount of the aqueous solvent in the ethyleneimine polymer according to the present invention is preferably in a range of 67 to 400 mass %, more preferably in a range of 150 to 354 mass %, and further preferably in a range of 185 to 300 mass % with respect to 100 mass % of the solid content. Here, if the amount of the aqueous solvent in the ethyleneimine polymer according to the present invention is 67 mass % or more with respect to 100 mass % of the solid content, this would facilitate such an advantage that viscosity will be so low to achieve easy handling. If the amount of the aqueous solvent in the ethyleneimine polymer according to the present invention is 400 mass % or less with respect to 100 mass % of the solid content, an active component (resin content) of the polymer would be high, thereby being suitable for usages in which use of a solvent is not preferable and improving substantial productivity, for example.

<Production Method for Ethyleneimine Polymer Solution>

There is no particular limitation as to how to produce the ethyleneimine polymer solution according to the present invention. Where applicable, an ethyleneimine polymer (solution) prepared by a well-known production method for the ethyleneimine polymer (solution) is subjected to a process for removing a low molecular weight component content from the ethyleneimine polymer (solution), so that the ethyleneimine polymer contained therein will satisfy specifications of the weight average molecular weight (Mw) and the high molecular weight component ratio described above, thereby obtaining the ethyleneimine polymer solution according to the present invention.

Furthermore, according to another aspect of the present invention, a production method for the ethyleneimine polymer solution is also provided. That is, another aspect of the present invention relates to a production method for an ethyleneimine polymer solution, including a synthesis step for synthesizing an ethyleneimine polymer by polymerizing ethyleneimine in an aqueous solvent. Then, in the production method, the above synthesis step is characterized by including polymerizing ethyleneimine in a reaction system including a polyamine compound whose weight average molecular weight is in a range of 1,000 to 100,000 and whose dispersibility is 10.0 or less, and an organic compound having two or more halogen elements in its molecule. According to this method, it is possible to obtain the ethyleneimine polymer solution according to the aspect of the present invention described above. In the following, preferable embodiments of the production method according to this aspect will be described.

[Ethylene Imine]

In the production method according to this aspect, a synthesis step performs polymerization reaction of ethyleneimine. Thereby, an ethyleneimine polymer is obtained in a form of solution.

Ethyleneimine for use in the polymerization reaction is not particularly limited, and examples of the synthetic method thereof may include a method in which halogenated ethylamine is subjected to intramolecular ring closure in a liquid phase with concentrated alkali, a method in which monoethanolamine sulfate ester is subjected to intramolecular ring closure with hot concentrated alkali (hereinafter, also referred to as liquid phase method), a method in which monoethanolamine is subjected to catalytic vapor phase intramolecular dehydration reaction (hereinafter, also referred to as vapor phase method), or the like.

For ethyleneimine to be obtained by the vapor phase method, crude ethyleneimine recovered by a simple distillation operation of an ethyleneimine-containing reaction mixture obtained from monoethanolamine by the vapor phase method can be used as a raw material for the polymerization (JP 2001-213958 A). Incidentally, in the case of polymerizing crude ethyleneimine, for example as described in JP 2001-261820 A, the method may include subjecting the ethyleneimine polymer (hereinafter, referred to as crude ethyleneimine polymer in some cases) to a simple purification operation thereby to obtain a high-purity ethyleneimine polymer that meets the industrially required quality standards.

It is also possible to utilize purified ethyleneimine obtained by highly purifying the ethyleneimine-containing reaction mixture described above as a raw material for the ethyleneimine polymer synthesis. In this case, the ethyleneimine-containing reaction mixture contains various heavy impurities and light impurities. Examples of the heavy impurities may include unreacted monoethanolamine; an oligomer of ethyleneimine, a ketone such as acetaldehyde; the Schiff base produced by the reaction of acetaldehyde with monoethanolamine of the raw material; and the like. Further, examples of the light impurities may include light amines such as ammonia, methylamine, and ethylamine and acetonitrile. Purified ethyleneimine obtained by removing these impurities through a high purification step is subjected to the polymerization reaction.

The technique to produce an ethyleneimine polymer using purified ethyleneimine obtained through a high purification step cannot avoid an increase in production cost associated with the implementation of the high purification step, and therefore it cannot be said that the technique is industrially advantageous. Thus, crude ethyleneimine is preferably used as the ethyleneimine raw material.

[Reaction Seed (Polyamine Compound)]

For the production method according to the present aspect, it is one of characteristic features that the synthesis step uses a compound that can serve as a starting point of the polymerization reaction of ethyleneimine (which may be referred to as "reaction seed" in this Description). More specifically, it is considered that, by configuring such that a polyamine compound whose weight average molecular weight is in a range of 1,000 to 100,000 and dispersibility is 10.0 or less is used as a reaction seed, and the polymerization reaction of ethyleneimine is carried out by using the reaction seed as its starting point, it will become possible to attain an ethyleneimine polymer synthesized with a high molecular weight. On the other hand, if such a polyamine compound is not used, or if the molecular weight or the dispersibility of the polyamine compound is out of the ranges described above, it would not be possible to attain sufficiently high molecular weight of the ethyleneimine polymer.

Examples of such a polyamine compound may include, apart from polyethyleneimine, modified polyethyleneimine modified with alkylene oxide such as ethylene oxide, propylene oxide, or the like, polyallylamine, polyoxyalkylene diamine, polyamideamine, polyvinyl amine, and the like. Incidentally, examples of commercially available polyamine compounds usable as the reaction seed in the production method according to this aspect may include EPOMIN SP-018, SP-012, SP-200, and HM-2000 (made by Nippon Shokubai Co., Ltd.) and the like. Of course, as long as the specifications are satisfied, a polyamine compound synthesized per se according to a standard method may be used as the reaction seed. Moreover, one type of the polyamine compound may be used solely, or two or more types of the polyamine compounds may be used in combination.

Incidentally, a weight average molecular weight of the polyamine compound is preferably 1,000 or more, or more preferably 1,500 or more. On the other hand, an upper limit of the weight average molecular weight is preferably 100,000 or less, or more preferably 75,000 or less. Furthermore, dispersibility of the polyamine compound is preferably 10.0 or less, more preferably 8.0 or less, or further preferably 6.0 or less. Incidentally, a lower limit of the value of the dispersibility is theoretically 1.00 or more, and usually 1.1 or more. As the values of the weight average molecular weight and the dispersibility of the polyamine compound, values measured by gel permeation chromatography (GPC)

similar to that used for the molecular weight measurement of the ethyleneimine polymer according to the present invention are adopted.

An amount of the polyamine compound used in the synthesis step is not particularly limited, but is preferably in a range of 0.4 to 40 mass %, more preferably in a range of 2 to 20 mass %, or more preferably in a range of 3 to 10 mass % with respect to 100 mass % of the amount of ethyleneimine used. If the amount of the polyamine compound used is 0.4 mass % or more, a reaction possibility between ethyleneimine and polyamine compound would be improved, thereby sufficiently expressing the effect of the use of the polyamine compound as the reaction seed (attaining an ethyleneimine polymer with a high molecular weight). On the other hand, if the amount of the polyamine compound used is 40 mass % or less, a certain enough amount of ethyleneimine available to react per one molecule of the reaction seed is secured, thereby, again, making it possible to sufficiently attain an ethyleneimine polymer with a high molecular weight.

[Organic Compound with Two or More Halogen Elements in its Molecule (Halogen-Containing Compound)]

The production method according to the present aspect is also characterized in that the synthesis step carries out the polymerization reaction of ethyleneimine in a reaction system in which an organic compound having two or more halogen elements in its molecule (which may be referred to as "halogen-containing compound" in this Description) also coexists in addition to the predetermined polyamine compound described above. It is considered that, by carrying out the polymerization reaction of the ethyleneimine in such a way, it will become possible to attain an ethyleneimine polymer synthesized with a high molecular weight. The "halogen elements" may be any of fluorine, chlorine, bromine, and iodine, but are preferably chlorine or bromine, or especially preferably chlorine. The number of the halogen elements that the halogen-containing compound has in its molecule is not particularly limited as long as the number of halogen elements is two or more, but is preferably in a range of 2 to 5, more preferably in a range of 2 to 4, further preferably in a range of 2 to 3, or most preferably 2.

In one preferable embodiment of the present invention, the above halogen-containing compound is a water-soluble compound having one or more hydrophilic group in its molecule. In this Description, the "water-soluble compound" means a compound whose solubility in 25° C. water is 3 g/100 g or more. Because the reaction seed and the ethyleneimine as the reaction raw material are water-soluble, the polymerization reaction of ethyleneimine according to the present invention proceeds in the aqueous solvent. For this reason, the use of the water-soluble compound as the halogen-containing compound makes it possible for the halogen-containing compound to participate in a propagation reaction of the molecule together with ethyleneimine and the reaction seed (polyamine compound), thereby down-regulating proceeding of a side reaction in which ethyleneimine reacts with water (hydration reaction). As a result, it will become possible to prevent an increase of low molecular weight components.

Here, examples of the "hydrophilic group" may include a hydroxy group, a carboxy group, a sulfo group, a carbonyl group, an amino group, an ether bond, or the like. By carrying out the polymerization reaction of ethyleneimine in the presence of the organic compound having a hydrophilic group in addition to two or more halogen atoms, it will become possible to attain an ethyleneimine polymer with a much higher molecular weight as a final product, and therefore, it is preferable to carry out the polymerization reaction of ethyleneimine in such a manner. The number of the hydrophilic groups that the organic compound has in its molecule is not particularly limited as long as the number of the hydrophilic groups is one or more, but is preferably in a range of 1 to 4, more preferably in a range of 1 to 3, further preferably in a range of 1 to 2, or most preferably 1.

Examples of such halogen-containing compounds may include 1,3-dichloro-2-propanol, 2,3-dichloro-1-propanol, 2,3-dichloropropionic acid, dichloroacetic acid, 2,2-dichloropropionic acid, trichloro acetic acid, 1,4-dichloro-1-butanol, 1,4-dichloro-2,3-butanediol, 2,2,2-trichloroethanol, and the like, and 1,3-dichloro-2-propanol is preferable.

In another preferred embodiment, the halogen-containing compound is a poorly-water-soluble compound having no hydrophilic groups in its molecule. Such a halogen-containing compound may be used solely but it is preferable that such a halogen-containing compound be used in combination with at least one Brønsted acid described later. In this Description, the "poorly-water-soluble compound" means a compound whose solubility in 25° C. water is less than 3 g/100 g.

Examples of such a halogen-containing compound may include 1,2-dichloroethane, 2,2-dichloropropane, 1,1,2-trichloroethane, 2,2-dichlorobutane, 1,1,2-trichloropropane, and the like. A most preferable combination is 1,2-dichloroethane and a Brønsted acid (especially hydrochloric acid).

Incidentally, the above halogen-containing compound may be used solely or two or more of the halogen-containing compounds may be used in combination.

The amount of the halogen-containing compound used in the synthesis step is not particularly limited, but is preferably in a range of 0.8 to 3.0 mass %, more preferably in a range of 0.9 to 2.5 mass %, or further preferably in a range of 1.0 to 2.0 mass % with respect to 100 mass % of the amount of ethyleneimine used. If the amount of the above halogen-containing compound used is within such a range, it would become possible to effectively attain an ethyleneimine polymer with a high molecular weight as a final product by using the polyamine compound as the reaction seed.

[Brønsted Acid]

The halogen-containing compound as described above may be used solely, but preferably, it is preferable that the reaction system of the synthesis step further contain at least one Brønsted acid. Especially, in the case where the halogen-containing compound is a poorly-water-soluble compound having no hydrophilic groups, it is effective to use the halogen-containing compound in combination with a Brønsted acid.

The "Brønsted acid" is an acid having such a property that donates a proton (Hf) to a base. Examples of the Brønsted acid may include, for example: hydrochloric acid, sulfuric acid, nitric acid, phosphoric acid, methyl phosphoric acid, alkyl phosphoric acid, phenyl phosphoric acid, diphenyl phosphite, phenyl phosphonate, 4-methoxyphenyl phosphonate, diethyl 4-methoxyphenyl phosphonate, phenylphosphinic acid, boric acid, phenylboronic acid, trifluoromethanesulfonate, p-toluenesulfonate, phenol, tungstic acid, and phosphotungstic acid; alkyl carbonic acids such as formic acid, acetic acid, trifluoroacetic acid, propionic acid, butyric acid; and aromatic carboxylic acids such as benzoic acid, phthalic acid, and salicylic acid; and the like. Among them, hydrochloric acid, bromic acid, nitric acid, and p-toluenesulfonate are preferably used, and hydrochloric acid is most preferably used.

[Deduced Reaction Mechanism]

A deduced reaction mechanism in the production method according to the present aspect will be described below, referring to an example in which the above halogen-containing compound is 1,2-dichloroethane, and hydrochloric acid, which is a Brønsted acid, coexists in the reaction system. It should be noted that the technical scope is not limited to the following deduced mechanism.

It is deduced that two reaction mechanisms as described below participate in the polymerization reactions according to the present invention.

(First Reaction Mechanism)

As shown in the following reaction formula, a primary (or secondary) amino group contained in the polyamine compound reacts with the halogen-containing compound (for example, 1,2-dichloroethane) or turns into a hydrochloride (ammonium salt) of a secondary (or tertiary) amine in the presence of hydrochloric acid.

[Chem. 1]

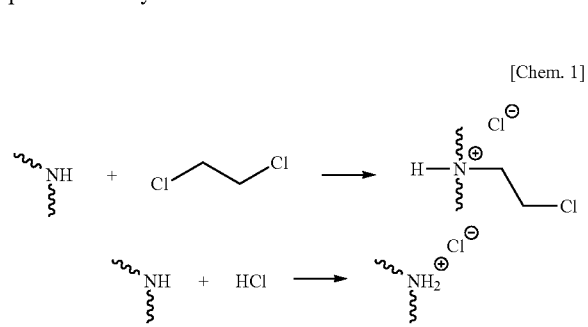

Next, as illustrated in the following reaction formula, a reaction with ethyleneimine proceeds with the ammonium salt thus produced serving as the start point (consecutive reaction), thereby propagating the molecule.

[Chem. 2]

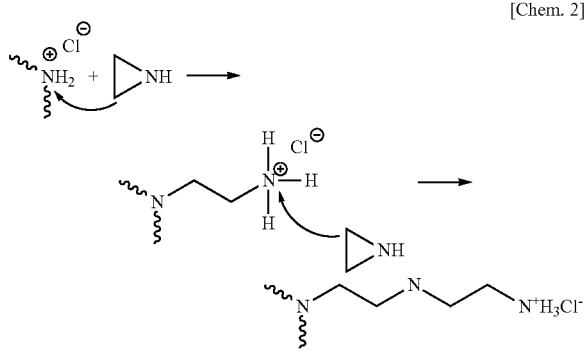

(Second Reaction Mechanism)

The halogen-containing compound (for example, 1,2-dichlororethane) reacts with ethyleneimine, thereby turning into immonium (ion). Next, a reaction with ethyleneimine proceeds with the immonium (ion) thus produced serving as the start point (consecutive reaction), thereby propagating the molecule.

[Chem. 3]

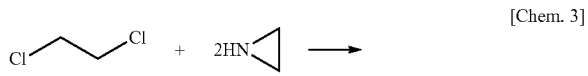

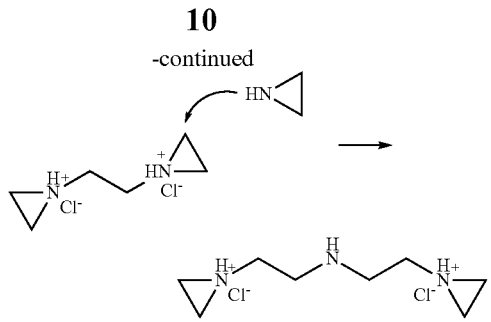

Furthermore, the immonium (ion) finally reacts with a primary (or secondary) amine, thereby proceeding intermolecular cross-linking reaction.

[Chem. 4]

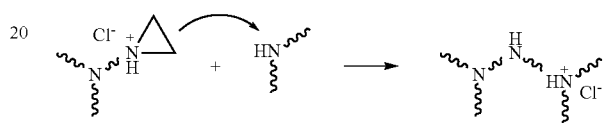

[Reaction Conditions]

Temperatures for the reaction system in polymerizing ethyleneimine is not particularly limited, but in view of effectively realizing a high molecular weight in ethyleneimine polymer thus produced, the temperature is preferably in a range of 50 to 150° C., more preferably in a range of 60 to 120° C., or further preferably in a range of 70 to 90° C.

The synthesis step in the production method according to the present aspect may use a heat transfer medium such as warm water, steam, heated oil, or the like, in order to remove the reaction heat. An upper limit of the temperature of the heat transfer medium is not particularly limited, but the temperature of the heat transfer medium is preferably lower than the temperature of the reaction system described above to allow to control the reaction temperature. By keeping the temperature of the heat transfer medium, it becomes possible to down-regulate local elevation of viscosity in the reaction system during the reaction of ethyleneimine, thereby allowing highly effective stirring to avoid local accumulation, thereby making it possible to attain uniform polymerization, therefore the reaction of ethyleneimine can be uniformly and effectively performed.

In the synthesis step of the production method according to the present aspect, the polymerization of ethyleneimine is conducted preferably in an inert gas atmosphere having an oxygen concentration of 2% by volume or less, which is more preferably 1% by volume or less, or even more preferably 0.5% by volume or less. If the oxygen concentration is 2% by volume or less, it is possible to effectively suppress coloration of the ethyleneimine polymer and to prevent coloration of the ethyleneimine polymer during preservation or storage. The inert gas is not particularly limited, but for example, nitrogen, helium, or argon can be used, and nitrogen is suitably usable.

The pressure for the polymerization may be any of normal pressure, reduced pressure, increased pressure, and the polymerization is usually conducted at a pressure in a range of from 0 to 10 MPaG and preferably in a range of from 0 to 2 MPaG. The aging of the reaction mixture is usually conducted at a pressure in a range of from 0 to 10 MPaG and preferably a pressure in a range of from 0 to 2 MPaG. Here, MPaG (megapascal gauge) refers to the gauge pressure.

The reactor used for the polymerization reaction and the aging treatment described below is not particularly limited, but one which is equipped with a stirrer for heat removal, dispersion, and reaction promotion in consideration of viscosity elevation during the polymerization and a thermometer and a cooling device for controlling the reaction is generally used.

[Methods for Adding Each Component]

The method for adding each component to the reaction system is not particularly limited, but it is preferable to use any of the following three methods, for example.

(Batch-wise Addition)

This is a method in which predetermined amounts of an aqueous solvent (preferably, water), a polyamine compound, a halogen-containing compound, and, if necessary, a Brønsted acid, and ethyleneimine are added in a reactor in advance, and the temperature in the reaction system is increased to a predetermined temperature.

(Continuous Addition)

This is a method in which predetermined amounts of an aqueous solvent (preferably, water), a polyamine compound, a halogen-containing compound, and, if necessary, a Brønsted acid are added in a reactor in advance, and the temperature in the reaction system is increased to a predetermined temperature, and thereafter ethyleneimine is continuously added thereto. Incidentally, the predetermined amounts of halogen-containing compound and aqueous solvent may be such that part or the whole amount thereof is added in the reaction system together with ethyleneimine.

(Intermittent Addition)

This is a method in which predetermined amounts of an aqueous solvent (preferably, water), a polyamine compound, a halogen-containing compound, and, if necessary, a Brønsted acid are added in a reactor in advance, and the temperature in the reaction system is increased to a predetermined temperature, and thereafter ethyleneimine is intermittently added thereto. Incidentally, the predetermined amounts of halogen-containing compound and aqueous solvent may be such that part or the whole amount thereof is added intermittently together with ethyleneimine.

It is possible to obtain the ethyleneimine polymer solution according to the invention by using any of the three methods described above. From the viewpoint of obtaining a higher molecular weight, the continuous addition is most preferable among the above three methods, and the intermittent addition and the batch-wise addition are in this order for preferability.

The rate of the addition of ethyleneimine is determined in consideration of the reaction rate and the capacity or heat removal capability of the polymerization apparatus in any of the three methods described above from the viewpoint of suppressing a rapid reaction and controlling the reaction. In general, the ethyleneimine is continuously added at an addition rate such that the addition is completed preferably in from 0.5 to 20 hours and more preferably in from 4 to 10 hours. Incidentally, the addition rate may be changed during the polymerization in order to control the polymerization temperature in the continuous addition and the intermittent addition. In addition, it is preferable to conduct the addition while stirring the mixture using stirring blades or the like in order to control the polymerization temperature at the time of the addition.

The amount of the aqueous solvent used in the reaction is not particularly limited, but may be set as appropriate in consideration of the relationship between the solid content and the aqueous solvent content in the ethyleneimine polymer solution according to one aspect of the present invention. For example, it is preferable to determine the amount of aqueous solvent used in the reaction in such a way that the relationship between the solid content and the aqueous solvent as described above will be satisfied after the synthesis step and later-described aging step and purification step. According to such embodiment, it is possible to obtain the final product without further treatment after the completion of these steps, and therefore, such embodiment is preferable in terms of productivity and production cost. In this case, the amount of the aqueous solvent in the reaction system is preferably in a range of 67 to 400 mass %, more preferably in a range of 150 to 354 mass %, or further preferably in a range of 185 to 300 mass % with respect to 100 mass % of the total amount of ethyleneimine, the polyamine compound, and the aforementioned predetermined halogen-containing compound used.

Of course, a step of adding an aqueous solvent or a step of removing an aqueous solvent may be carried out after the completion of these steps so as to finally obtain an ethyleneimine polymer solution having the solid content concentration (aqueous solvent concentration) targeted. In this case, the amount of the aqueous solvent used in the reaction may be determined, considering that the aqueous solvent is added or removed after the completion of these steps. Incidentally, there is no particular limitation as to concrete means for adjusting the solid content concentration (aqueous solvent concentration) in the obtained solution after the synthesis step for the ethyleneimine polymer, and for example, a method for adding the aqueous solvent into the obtained ethyleneimine polymer solution, a method for removing the aqueous solvent by distillation or the like are exemplified. Furthermore, the dehydration can be further easily performed by being carried out by combining reduced-pressure dehydration, use of a carrier gas such as nitrogen, use of a water-azeotropic solvent, and/or the like.

[Aging Step]

The production method according to the present aspect may include a aging step. The aging step is a step that further keeps the temperature of the reaction system at a predetermined temperature after a majority (for example, 95 mol % or more) of ethyleneimine added in the reaction system as the reaction raw material has been consumed by the reaction. By performing such an aging step, it becomes possible to reduce the amount of remaining ethyleneimine. Furthermore, it becomes possible to substantially complete the intermolecular reaction between the immonium (ion) and the primary (or secondary) amino group contained in the polyamine compound as described above for the reaction mechanism.

Such an aging step may be carried out, for example, after the completion of the synthesis step (post-synthesis aging step). In such an aging step carried out after the completion of the synthesis step (post-synthesis aging step), the reaction product obtained in the synthesis step may be heated at an aging temperature preferably in a range of 50 to 150° C., or more preferably in a range of 80 to 120° C. If the aging temperature in this step is 50° C. or higher (especially 80° C. or higher), the aging can be effectively carried out. Furthermore, if the aging temperature is 150° C. or lower (especially 120° C. or lower), heat decomposition of the ethyleneimine polymer as the product can be prevented, thereby making it possible to obtain the ethyleneimine polymer with a high quality. Furthermore, the aging temperature may be changed in the middle of the post-synthesis aging step, and may be preferably increased in the middle of the post-synthesis aging step. There are no particular limitation as to an aging time in the post-synthesis aging step (if the aging temperature is changed, total aging times at all the aging temperatures), but it is preferable that the aging time be in a range of about 1 to 10 hours.

Furthermore, the aging step may be carried out in the middle of the polymerization reaction of ethyleneimine during the aforementioned synthesis step (intermediate aging step). This second aging step is an aging step that satisfies the aforementioned definition of the aging step, and is associated with the addition of ethyleneimine and continuation of the polymerization reaction therewith after the end of this aging step. In the intermediate aging step, the reaction product in the middle of the reaction in the synthesis step may be heated preferably at an aging temperature in a range of 50 to 150° C., or more preferably in a range of 80 to 120° C. If the aging temperature in this step is 50° C. or higher (especially 80° C. or higher), the aging can be effectively carried out. Furthermore, if the aging temperature is 150° C. or lower (especially 120° C. or lower), heat decomposition of the ethyleneimine polymer as the product can be prevented, thereby making it possible to obtain the ethyleneimine polymer with a high quality. Furthermore, the aging temperature may be changed in the middle of the intermediate aging step, but it is preferable that the aging temperature be not changed in the middle of the intermediate aging step. There are no particular limitation as to an aging time in the intermediate aging step (if the aging temperature is changed, total aging times at all the aging temperatures), but it is preferable that the aging time is in a range of about 0.5 to 5 hours.

[Purification Step]

The production method according to the present aspect may be such that the obtained reaction product (ethyleneimine polymer solution) per se is the final product, but may be such that the reaction product is subjected to a purification step so as to obtain a solution containing the ethyleneimine polymer with a higher purity.

Here, the purification of the ethyleneimine polymer solution after the reaction may be carried out, for example, according to such a method as inert gas bubbling described in JP 2013-71967 A. Furthermore, the following method can be applicable as the purification method of the ethyleneimine polymer solution. To begin with, after the end of the synthesis step or after the post-synthesis aging step subsequent thereto, the reaction product per se, or the reaction product is diluted as appropriate with an aqueous solvent (preferably, water). After that, the reaction product is distilled under normal pressure or reduced pressure at a boiling temperature so as to distill off the aqueous solvent and to remove low-boiling-point impurities together with the aqueous solvent.

[Usages]

The ethyleneimine polymer solution according to the present invention and a solution containing a modified product of the polymer are industrially widely applicable for usages such as adhesion promoters for extrusion polyethylene laminate for a base material such as paper, cloth, OPP films, PET films, and the like (anchor coating agent), sludge coagulants (water treatment agents), pulp freeness improvers, papermaking chemicals, pulp yield improvers for kraft digestion, graping adhesion improvers, heavy metal chelating agents, additives for metal plating, foam fire-extinguishing agents, adhesion improvers of polyvinyl chloride sol type adhesives, cross-linking agents for epoxy resin, adhesion improvers for ethylene vinyl acetate copolymer (EVA) ·Polyvinyl acetate (PVAc)·polyvinyl alcohol (PVA), modifiers for adhesives, adhesion promoters for film printing ink, adhesion improvers for paint, dispersing agents for pigment or the like, enzyme immobilization agents, additives for cement for oil drilling, scaling inhibitors, surface modifiers for glass or carbon fibers, sticking agents for dye, detergents for fibers or eating utensils, metal corrosion inhibitors, wood preservatives, hair-care products, additives for cosmetics, adsorbents for carbon dioxide gas, chlorine, nitrogen oxide, sulfur oxide, hydrogen sulfide, or aldehydes, malodor counteractant (adsorbents) for cloths or air, anti-slip agents for polyvinyl acetal-type films, heat resistance or oil proof improvers for thermoplastic polymers such as polyamides, polyacetals, polyolefins, polyesters, PVC, polycarbonates, and the like, antistatic agents for polyolefins, cross-linking agents for polymers having a ring acid anhydride group, and surface modifiers for water-absorbing resins. Among them, preferable usages are adhesion promoters for laminates (anchor coating agents), sludge coagulants (water treatment agents), and pulp freeness improvers.

Incidentally, examples of modified products of ethyleneimine polymers according to the present invention may include cross-linked reaction products by multivalent epoxy compounds, multivalent carboxylic acids, epichlorohydrin, formaldehydes, or the like.

According to another aspect of the present invention, as a method for using the ethyleneimine polymer solution according to the present invention, a method for promoting adhesion for laminate by using the solution as an adhesion improver is provided. Here, it is also one preferable embodiment that the ethyleneimine polymer solution according to the present invention be used in combination with another adhesion improver.

According to still another aspect of the present invention, as a method for using the ethyleneimine polymer solution according to the present invention, a method for water treatment method in which the solution is used as a sludge coagulant or pulp freeness improver is also provided. Again in this method for water treatment, it is also one preferable embodiment that the ethyleneimine polymer solution according to the present invention is used in combination with another sludge coagulant or pulp freeness improver.

EXAMPLES

Hereinafter, the invention will be described in detail with reference to Examples, but the invention is not limited thereto.

[Examples of Production of Ethyleneimine Polymer Aqueous Solution]

Example 1

In a reactor of 0.5-L capacity equipped with a thermometer, a reflux cooler, and a stirrer, 7.5 g of water and 5 g of polyethyleneimine (made by Nippon Shokubai Co., Ltd., EPOMIN SP-018, Mw: 2,299, Mn: 1,669, Mw/Mn=1.4) were added and heated. After the temperature in this reaction system was increased to 80° C., 50 g of ethyleneimine, 0.79 g of 1,3-dichloropropan-2-ol (made by Wako Pure Chemicals, Reagent Special grade), and 76.2 g of water were added at a constant adding rate over 4 hours, while the temperature of the reaction system was kept at 80° C. (first stage reaction). After that, the reaction system was aged at 80° C. for 2 hours (intermediate aging step). After that, 116.7 g of ethyleneimine, 1.63 g of 1,3-dichloropropan-2-ol (made by Wako Pure Chemicals, Reagent Special grade), and 177.5 g of water were added again at a constant adding rate over 4 hours, while the temperature of the reaction system was kept at 80° C. (second stage reaction). After that, the reaction system was pre-aged at 80° C. for 2 hours, and further aged at 120° C. for 2 hours (post-synthesis aging step), thereby obtaining an ethyleneimine polymer aqueous solution (resin content 40 mass %). The ethyleneimine polymer aqueous solution thus obtained was measured by GPC to find a molecular weight of an ethyleneimine polymer contained therein. The measurement showed that Mw was 647,000 and high molecular weight component ratio was 74.7 mass %. These results are shown in Table 1 and FIG. 1 as well. Incidentally, the amount of polyethyleneimine (SP-018) used in the reaction was 3.0 mass % with respect to 100 mass % of ethyleneimine. Furthermore, the amount of 1,3-dichloropropan-2-ol added was 1.45 mass % with respect to 100 mass % of ethyleneimine.

Example 2

An ethyleneimine polymer aqueous solution was prepared in the same manner as in Example 1, except that 1,2-dichloroethane (made by Wako Pure Chemicals, Reagent Special grade) was used instead of 1,3-dichloropropan-2-ol, and the amount thereof added was changed to 1.44 mass % with respect to 100 mass % of ethyleneimine. The ethyleneimine polymer aqueous solution thus obtained was measured by GPC to find a molecular weight of an ethyleneimine polymer contained therein. The measurement showed that Mw was 638,000 and high molecular weight component ratio was 69.9 mass %. These results are shown in Table 1 as well.

Example 3

In a reactor of 0.5-L capacity equipped with a thermometer, a reflux cooler, and a stirrer, 7.5 g of water and 5 g of polyethyleneimine (made by Nippon Shokubai Co., Ltd., EPOMIN SP-018, Mw: 2,299, Mn: 1,669, Mw/Mn=1.4), and 0.395 g of 38 mass % hydrochloric acid were added and heated. After the temperature in this reaction system was increased to 80° C., 50 g of ethyleneimine, 0.60 g of 1,2-dichloroethane (made by Wako Pure Chemicals, Reagent Special grade), and 76.2 g of water were added at a constant adding rate over 4 hours, while the temperature of the reaction system was kept at 80° C. (first stage reaction). After that, the reaction system was aged at 80° C. for 2 hours (intermediate aging step). After 0.614 g of 38 mass % hydrochloric acid were added, 116.7 g of ethyleneimine, 1.63 g of 1,2-dichloroethane (made by Wako Pure Chemicals, Reagent Special grade), and 174 g of water were added again at a constant adding rate over 4 hours, while the temperature of the reaction system was kept at 80° C. (second stage reaction). After that, the reaction system was pre-aged at 80° C. for 2 hours, and further aged at 120° C. for 2 hours (post-synthesis aging step), thereby obtaining an ethyleneimine polymer aqueous solution (resin content 40 mass %). The ethyleneimine polymer aqueous solution thus obtained was measured by GPC to find a molecular weight of an ethyleneimine polymer contained therein. The measurement showed that Mw was 650,000 and high molecular weight component ratio was 75.2 mass %. These results are shown in Table 1 as well. Incidentally, the amount of polyethyleneimine (SP-018) used in the reaction was 3.0 mass % with respect to 100 mass % of ethyleneimine. Furthermore, the total amount of 1,2-dichloroethane and hydrochloric acid (hydrogen chloride) added was 1.57 mass % with respect to 100 mass % of ethyleneimine.

Example 4

An ethyleneimine polymer aqueous solution was prepared in the same manner as in Example 1, except that polyethyleneimine (made by Nippon Shokubai Co., Ltd. SP-012, Mw: 1,610, Mn: 1,194, Mw/Mn=1.4) was used instead of EPOMIN SP-018, and the amount of 1,3-dichloropropan-2-ol added was changed to 1.86 mass % with respect to 100 mass % of ethyleneimine. The ethyleneimine polymer aqueous solution thus obtained was measured by GPC to find a molecular weight of an ethyleneimine polymer contained therein. The measurement showed that Mw was 860,000 and high molecular weight component ratio was 69.0 mass %. These results are shown in Table 1 as well.

Example 5

An ethyleneimine polymer aqueous solution was prepared in the same manner as in Example 1, except that the amount of polyethyleneimine used in the reaction (SP-018) was changed to 5.0 mass % with respect to 100 mass % of ethyleneimine, and the amount of 1,3-dichloropropan-2-ol added was changed to 1.59 mass % with respect to 100 mass % of ethyleneimine. The ethyleneimine polymer aqueous solution thus obtained was measured by GPC to find a molecular weight of an ethyleneimine polymer contained therein. The measurement showed that Mw was 518,000 and high molecular weight component ratio was 68.2 mass %. These results are shown in Table 1 as well.

Example 6

An ethyleneimine polymer aqueous solution was prepared in the same manner as in Example 1, except that the amount of polyethyleneimine used in the reaction (SP-018) was changed to 2.0 mass % with respect to 100 mass % of ethyleneimine, and the amount of 1,3-dichloropropan-2-ol added was changed to 1.36 mass % with respect to 100 mass % of ethyleneimine. The ethyleneimine polymer aqueous solution thus obtained was measured by GPC to find a molecular weight of an ethyleneimine polymer contained therein. The measurement showed that Mw was 538,000 and high molecular weight component ratio was 67.8 mass %. These results are shown in Table 1 as well.

Example 7

An ethyleneimine polymer aqueous solution was prepared in the same manner as in Example 1, except that the amount of 1,3-dichloropropan-2-ol added was changed to 1.59 mass % with respect to 100 mass % of ethyleneimine and that the final resin content was changed to 20 mass %. The ethyleneimine polymer aqueous solution thus obtained was measured by GPC to find a molecular weight of an ethyleneimine polymer contained therein. The measurement showed that Mw was 543,000 and high molecular weight component ratio was 74.1 mass %. These results are shown in Table 1 as well.

Example 8

An ethyleneimine polymer aqueous solution was prepared in the same manner as in Example 1, except that the amount of 1,3-dichloropropan-2-ol added was changed to 1.38 mass % with respect to 100 mass % of ethyleneimine and that the final resin content was changed to 60 mass %. The ethyleneimine polymer aqueous solution thus obtained was measured by GPC to find a molecular weight of an ethyleneimine polymer contained therein. The measurement showed that Mw was 479,000 and high molecular weight component ratio was 68.4 mass %. These results are shown in Table 1 as well.

Example 9

An ethyleneimine polymer aqueous solution was prepared in the same manner as in Example 1, except that the amount of 1,3-dichloropropan-2-ol added was changed to 1.45 mass % with respect to 100 mass % of ethyleneimine and that the polymerization temperature was changed to 60° C. The ethyleneimine polymer aqueous solution thus obtained was measured by GPC to find a molecular weight of an ethyleneimine polymer contained therein. The measurement showed that Mw was 585,000 and high molecular weight component ratio was 69.3 mass %. These results are shown in Table 1 as well.

Example 10

An ethyleneimine polymer aqueous solution was prepared in the same manner as in Example 3, except that the polymerization temperature was changed to 60° C. The ethyleneimine polymer aqueous solution thus obtained was measured by GPC to find a molecular weight of an ethyleneimine polymer contained therein. The measurement showed that Mw was 559,000 and high molecular weight component ratio was 70.6 mass %. These results are shown in Table 1 as well.

Example 11

An ethyleneimine polymer aqueous solution was prepared in the same manner as in Example 1, except that the amount of 1,3-dichloropropan-2-ol added was changed to 1.73 mass % with respect to 100 mass % of ethyleneimine and that the polymerization temperature was changed to 120° C. The ethyleneimine polymer aqueous solution thus obtained was measured by GPC to find a molecular weight of an ethyleneimine polymer contained therein. The measurement showed that Mw was 461,000 and high molecular weight component ratio was 67.1 mass %. These results are shown in Table 1 as well.

Example 12

In a reactor of 0.5-L capacity equipped with a thermometer, a reflux cooler, and a stirrer, 7.5 g of water and 5 g of polyethyleneimine (made by Nippon Shokubai Co., Ltd., EPOMIN SP-018, Mw: 2,299, Mn: 1,669, Mw/Mn=1.4), and 0.39 g of 38 mass % hydrochloric acid were added and heated. After the temperature in this reaction system was increased to 80° C., 50 g of ethyleneimine, 0.60 g of 1,2-dichloroethane (made by Wako Pure Chemicals, Reagent Special grade), and 76.2 g of water were added at a constant adding rate over 4 hours, while the temperature of the reaction system was kept at 80° C. (first stage reaction). After that, the reaction system was aged at 120° C. for 2 hours (intermediate curing step). After that, 116.7 g of ethyleneimine, 2.33 g of 1,2-dichloroethane (made by Wako Pure Chemicals, Reagent Special grade), and 165 g of water were added again at a constant adding rate over 4 hours, while the temperature of the reaction system was kept at 80° C. (second stage reaction). After that, the reaction system was aged at 80° C. for 2 hours (post-synthesis aging step), thereby obtaining an ethyleneimine polymer aqueous solution (resin content 40 mass %). The ethyleneimine polymer aqueous solution thus obtained was measured by GPC to find a molecular weight of an ethyleneimine polymer contained therein. The measurement showed that Mw was 463,000 and high molecular weight component ratio was 67.5 mass %. These results are shown in Table 1 as well. Incidentally, the amount of polyethyleneimine (SP-018) used in the reaction was 3.0 mass % with respect to 100 mass % of ethyleneimine. Furthermore, the total amount of 1,2-dichloroethane and hydrochloric acid (hydrogen chloride) added was 1.85 mass % with respect to 100 mass % of ethyleneimine.

Example 13

In a reactor of 0.5-L capacity equipped with a thermometer, a reflux cooler, and a stirrer, 7.5 g of water and 5 g of polyethyleneimine (made by Nippon Shokubai Co., Ltd., EPOMIN SP-018, Mw: 2,299, Mn: 1,669, Mw/Mn=1.4) were added and heated. After the temperature in this reaction system was increased to 80° C., 166.7 g of ethyleneimine, 2.58 g of 1,3-dichloropropan-2-ol (made by Wako Pure Chemicals, Reagent Special grade), and 291 g of water were added at a constant adding rate over 4 hours, while the temperature of the reaction system was kept at 80° C. After that, the reaction system was pre-aged at 80° C. for 2 hours, and further aged at 120° C. for 2 hours (post-synthesis aging step), thereby obtaining an ethyleneimine polymer aqueous solution (resin content 40 mass %). The ethyleneimine polymer aqueous solution thus obtained was measured by GPC to find a molecular weight of an ethyleneimine polymer contained therein. The measurement showed that Mw was 569,000 and high molecular weight component ratio was 66.6 mass %. These results are shown in Table 1 as well. Incidentally, the amount of polyethyleneimine (SP-018) used in the reaction was 3.0 mass % with respect to 100 mass % of ethyleneimine. Furthermore, the amount of 1,3-dichloropropan-2-ol added was 1.55 mass % with respect to 100 mass % of ethyleneimine.

Example 14

In a reactor of 1.0-L capacity equipped with a thermometer, a reflux cooler, and a stirrer, 23 g of water and 15 g of polyethyleneimine (made by Nippon Shokubai Co., Ltd., EPOMIN HM-2000, Mw: 55,202, Mn: 9,204, Mw/Mn=6.0), and 1.18 g of 38 mass % hydrochloric acid were added and heated. After the temperature in this reaction system was increased to 80° C., 150 g of ethyleneimine, 2.07 g of 1,2-dichloroethane (made by Wako Pure Chemicals, Reagent Special grade), and 366 g of water were added at a constant adding rate over 4 hours, while the temperature of the reaction system was kept at 80° C. After that, the reaction system was pre-aged at 80° C. for 2 hours, and further, the reaction system was aged at 120° C. for 2 hours (post-synthesis aging step), thereby obtaining an ethyleneimine polymer aqueous solution (resin content 30 mass %). The ethyleneimine polymer aqueous solution thus obtained was measured by GPC to find a molecular weight of an ethyleneimine polymer contained therein. The measurement showed that Mw was 439,000 and high molecular weight component ratio was 68.0 mass %. These results are shown in Table 1 as well. Incidentally, the amount of polyethyleneimine (HM-2000) used in the reaction was 10.0 mass % with respect to 100 mass % of ethyleneimine. Furthermore, the total amount of 1,2-dichloroethane added was 1.68 mass % with respect to 100 mass % of ethyleneimine.

Comparative Example 1

In a reactor of 0.5-L capacity equipped with a thermometer, a reflux cooler, and a stirrer, 18.5 g of water and 7.03 g of 2-chloroethanol were added and heated. After the temperature in this reaction system was increased to 90° C., 370 g of ethyleneimine was added at a constant adding rate over 8 hours, while the temperature of the reaction system was kept at 90° C. After that, the reaction system was aged at 90° C. for 1 hour, thereby obtaining an ethyleneimine polymer aqueous solution (resin content 95 mass %). The ethyleneimine polymer aqueous solution thus obtained was measured by GPC to find a molecular weight of an ethyleneimine polymer contained therein. The measurement showed that Mw was 55,000 and high molecular weight component ratio was 57.0 mass %. These results are shown in Table 1 and FIG. 1 as well. Incidentally, the amount of 2-chloroethanol used was 1.94 mass % with respect to 100 mass % of ethyleneimine.

Comparative Example 2

In a reactor of 3-L capacity equipped with a thermometer, and a stirrer, 1200 g of water was added and heated. After the temperature in this reaction system was increased to 60° C., 800 g of ethyleneimine and 13.2 g of 1,2-dichloroethane were added at a constant adding rate over 8 hours, while the temperature of the reaction system was kept at 60° C. After that, the reaction system was aged at 60° C. for 4 hours, thereby obtaining an ethyleneimine polymer aqueous solution (resin content 40 mass %). The ethyleneimine polymer aqueous solution thus obtained was measured by GPC to find a molecular weight of an ethyleneimine polymer contained therein. The measurement showed that Mw was 247,000 and high molecular weight component ratio was 55.3 mass %. These results are shown in Table 1 and FIG. 1 as well. Incidentally, the amount of 1,2-dichloroethane used was 1.41 mass % with respect to 100 mass % of ethyleneimine.

Comparative Example 3

In a reactor of 0.5-L capacity equipped with a thermometer, a reflux cooler, and a stirrer, 7.5 g of water was added and heated. After the temperature in this reaction system was increased to 80° C., 166.7 g of ethyleneimine, 2.08 g of 1,3-dichloropropan-2-ol (made by Wako Pure Chemicals, Reagent Special grade), and 245 g of water were added at a constant adding rate over 4 hours, while the temperature of the reaction system was kept at 80° C. After that, the reaction system was pre-aged at 80° C. for 2 hours, and further aged at 120° C. for 2 hours (post-synthesis aging step), thereby obtaining an ethyleneimine polymer aqueous solution (resin content 40 mass %). The ethyleneimine polymer aqueous solution thus obtained was measured by GPC to find a molecular weight of an ethyleneimine polymer contained therein. The measurement showed that Mw was 137,000 and high molecular weight component ratio was 58.8 mass %. These results are shown in Table 1 as well. Furthermore, the amount of 1,3-dichloropropan-2-ol added was 1.25 mass % with respect to 100 mass % of ethyleneimine.

Comparative Example 4

In a reactor of 0.5-L capacity equipped with a thermometer, a reflux cooler, and a stirrer, 7.5 g of water and 5 g of polyethyleneimine (made by Nippon Shokubai Co., Ltd., EPOMIN SP-018, Mw: 2,299, Mn: 1,669, Mw/Mn=1.4) and 2.19 g of 38 mass % hydrochloric acid were added and heated. After the temperature in this reaction system was increased to 80° C., 166.7 g of ethyleneimine, and 247 g of water were added at a constant adding rate over 4 hours, while the temperature of the reaction system was kept at 80° C. After that, the reaction system was pre-aged at 80° C. for 2 hours, and further aged at 120° C. for 2 hours (post-synthesis aging step), thereby obtaining an ethyleneimine polymer aqueous solution (resin content 40 mass %). The ethyleneimine polymer aqueous solution thus obtained was measured by GPC to find a molecular weight of an ethyleneimine polymer contained therein. The measurement showed that Mw was 10,000 or less. These results are shown in Table 1 as well. Incidentally, the amount of polyethyleneimine (SP-018) used in the reaction was 3.0 mass % with respect to 100 mass % of ethyleneimine. Furthermore, the amount of hydrochloric acid (hydrogen chloride) added was 0.50 mass % with respect to 100 mass % of ethyleneimine.

TABLE 1

| No. | Catalyst Type | Reaction seed | Reaction seed amount (mass %) | Catalyst amount (mass %) | Resin content (wt %) | Polymerization temperature (° C.) | Polymerization method | Mw | High molecular weight component ratio (%) (>30,000) |
|---|---|---|---|---|---|---|---|---|---|
| Example 1 | 1,3-dichloropropan-2-ol | SP-018 | 3.0 | 1.45 | 40 | 80 | Double-stage polymerization | 647,000 | 74.7 |
| Example 2 | 1,2-dichloroethane | SP-018 | 3.0 | 1.44 | 40 | 80 | Double-stage polymerization | 638,000 | 69.9 |
| Example 3 | 1,2-dichloroethane + hydrochloric acid | SP-018 | 3.0 | 1.57 | 40 | 80 | Double-stage polymerization | 650,000 | 75.2 |
| Example 4 | 1,3-dichloropropan-2-ol | SP-012 | 3.0 | 1.86 | 40 | 80 | Double-stage polymerization | 860,000 | 69.0 |
| Example 5 | 1,3-dichloropropan-2-ol | SP-018 | 5.0 | 1.59 | 40 | 80 | Double-stage polymerization | 518,000 | 68.2 |
| Example 6 | 1,3-dichloropropan-2-ol | SP-018 | 2.0 | 1.36 | 40 | 80 | Double-stage polymerization | 538,000 | 67.8 |

TABLE 1-continued

| No. | Catalyst Type | Reaction seed | Reaction seed amount (mass %) | Catalyst amount (mass %) | Resin content (wt %) | Polymerization temperature (° C.) | Polymerization method | Mw | High molecular weight component ratio (%) (>30,000) |
|---|---|---|---|---|---|---|---|---|---|
| Example 7 | 1,3-dichloropropan-2-ol | SP-018 | 3.0 | 1.59 | 20 | 80 | Double-stage polymerization | 543,000 | 74.1 |
| Example 8 | 1,3-dichloropropan-2-ol | SP-018 | 3.0 | 1.38 | 60 | 80 | Double-stage polymerization | 479,000 | 68.4 |
| Example 9 | 1,3-dichloropropan-2-ol | SP-018 | 3.0 | 1.45 | 40 | 60 | Double-stage polymerization | 585,000 | 69.3 |
| Example 10 | 1,2-dichloroethane + hydrochloric acid | SP-018 | 3.0 | 1.57 | 40 | 60 | Double-stage polymerization | 559,000 | 70.6 |
| Example 11 | 1,3-dichloropropan-2-ol | SP-018 | 3.0 | 1.73 | 40 | 120 | Double-stage polymerization | 461,000 | 67.1 |
| Example 12 | 1,2-dichloroethane + hydrochloric acid | SP-018 | 3.0 | 1.85 | 40 | 120 | Double-stage polymerization | 463,000 | 67.5 |
| Example 13 | 1,3-dichloropropan-2-ol | SP-018 | 3.0 | 1.55 | 40 | 80 | Single-stage polymerization | 569,000 | 66.6 |
| Example 14 | 1,2-dichloroethane + hydrochloric acid | HM-2000 | 10.0 | 1.68 | 30 | 80 | Single-stage polymerization | 439,000 | 68.0 |
| Comparative example 1 | 2-chloroethanol | — | — | 1.94 | 95 | 90 | — | 55,000 | 57.0 |
| Comparative example 2 | 1,2-dichloroethane | — | — | 1.41 | 40 | 60 | — | 247,000 | 55.3 |
| Comparative example 3 | 1,3-dichloropropan-2-ol | — | — | 1.25 | 40 | 80 | Single-stage polymerization | 137,000 | 58.8 |
| Comparative example 4 | hydrochloric acid | SP-018 | 3.0 | 0.50 | 40 | 80 | Single-stage polymerization | <10,000 | — |

[Evaluation Examples of Usage of Ethyleneimine Polymer Aqueous Solution]

(Evaluation as Adhesion Promoter for Laminate (Anchor Coating Agent))

Onto a polypropylene film (OPP film) of 20 μm in thickness, the ethyleneimine polymer aqueous solutions respectively obtained in Examples 3 and 4, and Comparative Example 2 were applied as adhesion promoters for extrusion laminate (anchor coating agent) in such manner that solid content would be applied thereon in an amount of 0.1 g/m². Further, the ethyleneimine polymer aqueous solutions were dried under such conditions that drying temperature was 70° C. and film speed was 80 m/min. In this way, an anchor coat layer made from the ethyleneimine polymer was formed.

Next, on the anchor coat layer of the OPP film, a melted low-density polyethylene (LDPE) of 320° C. was extruded and pressure-bonded to laminate them. A laminate film thus obtained was fixed onto a pulling tester, and adhesion strength between the OPP film and the LDPE film was measured under the conditions of 180° peeling and 300 mm/min. For each of them, the test was repeated 5 times and calculated an average thereof. The results are shown in Table 2 below.

TABLE 2

| Adhesion promoter | Weight average molecular weight (Mw) | High molecular weight component ratio (mass %) | Adhesion strength (kg/15 mm) |
|---|---|---|---|
| Example 3 | 650,000 | 75.2 | 69 |
| Example 4 | 860,000 | 69.0 | 66 |
| Comparative example 2 | 247,000 | 55.3 | 40 |

As is clear from the results on table 2, the ethyleneimine polymer solution according to the present invention can express an excellent adhesion promoting effect (high adhesion strength) when used as an adhesion promoter for laminate (anchor coating agent).

(Evaluation as Sludge Coagulant)

Into beakers containing 200 mL of waste sludge from a chemical factory (SS concentration=1.35 wt %, VSS/SS=78.5 wt %, pH 6.2, fiber content/SS=1.01 wt %), the ethyleneimine polymer aqueous solutions respectively obtained in Examples 3 and 4 and Comparative Example 2 as a sludge coagulant were respectively added in such a way that solid content concentration would be 20 mg/L, and stirred at 250 rpm for 20 seconds by using a stirrer equipped with propeller blades. Next, quaternary ammonium salt of polydimethylaminoethyl methacrylate was added thereto as a coagulant in such a way that a concentration would be 300 mg/L, and the sludge was stirred at 180 rpm for 30 seconds by using a spatula, thereby coagulating the sludge. Then, flock diameters in the coagulation were visually measured.

Next, into a filter equipped with a nylon cloth of 40 mesh, the coagulated sludge thus obtained was poured, and an amount of filtrate after 10 seconds was measured, and outer appearance of the filtrate was observed. Furthermore, the sludge remained on the filter cloth (nylon cloth) was dried at 105° C., thereby calculating a sludge water content percentage. These results are shown on Table 3 below. Note that, in the results of the observation of the outer appearance of the filtrate, the circle means transparent, the triangle means slightly turbid, and the cross means significantly turbid.

TABLE 3

| Coagulant | Weight average molecular weight (Mw) | High molecular weight component ratio (mass %) | Flock diameter (mm) | Amount of filtrate after 10 sec (mL) | Outer appearance of filtrate | Sludge water content percentage (mass %) |
|---|---|---|---|---|---|---|
| Example 3 | 650,000 | 75.2 | 8 | 119 | ○ | 72.2 |
| Example 4 | 860,000 | 69.0 | 8 | 110 | ○ | 73.5 |
| Comparative example 2 | 247,000 | 55.3 | 5 | 92 | Δ | 81 |
| None | — | — | 4 | 71 | x | 86 |

As is clear from the results on Table 3, the ethyleneimine polymer solution according to the present invention can express an excellent coagulation effect when used as a sludge coagulant, and can effectively facilitate preparation of clean sludge-treated water.

(Pulp Freeness Improver)

Freeness test was conducted according to JIS 8121-2 (2001). In doing this, the ethyleneimine polymer aqueous solutions respectively obtained in Examples 3 and 4 and Comparative Example 2 were added to a pulp water suspension respectively as pulp freeness improver in an amount of 0.2 mass % with respect to the pulp mass. After the addition, the mixture was stirred, and the freeness was measured by using a pulp freeness tester (Canadian Freeness Tester). The results are shown on Table 4. Note that, collected paper, which was mainly cardboard, was used as the pulp.

TABLE 4

| Freeness improver | Weight average molecular weight (Mw) | High molecular weight component ratio (mass %) | Amount added (mass % with respect to pulp) | Freeness (mL) |
|---|---|---|---|---|
| Example 3 | 650,000 | 75.2 | 0.2 | 505 |
| Example 4 | 860,000 | 69.0 | 0.2 | 490 |
| Comparative example 2 | 247,000 | 55.3 | 0.2 | 465 |
| None | — | — | 0 | 305 |

As is clear from the results on Table 4, the ethyleneimine polymer solution according to the present invention can express excellent pulp coagulation function and a freeness improving effect when used as a freeness improver, thereby effectively making a contribution.

So far, the excellent effects of the ethyleneimine polymer solution according to the present invention in various usages have been described above. It is deduced that such effects can be expressed because especially of the high molecular weight component ratio of 60 mass % or more in the ethyleneimine polymer in addition to the large weight average molecular weight (Mw) of the ethyleneimine polymer contained in the ethyleneimine polymer (aqueous solution) according to the present invention.

It should be noted that the present application is based on Japanese Patent Application No. 2017-161466 filed on Aug. 24, 2017, and the whole disclosure of which is incorporated herein by reference.

The invention claimed is:

1. An ethyleneimine polymer solution comprising an ethyleneimine polymer and an aqueous solvent, wherein a weight average molecular weight (Mw) of the ethyleneimine polymer is 200,000 or more, the weight average molecular weight (Mw) being measured based on pullulan by gel permeation chromatography (GPC), and a ratio of polyethyleneimines having a molecular weight (Mw) of 30,000 or more is 60 mass % or more with respect to 100 mass % of a total amount of the ethyleneimine polymer.

2. The ethyleneimine polymer solution according to claim 1, wherein the ethyleneimine polymer is synthesized by polymerizing ethyleneimine in a reaction system containing an aqueous solvent, a polyamine compound whose weight average molecular weight is in a range of 1,000 to 100,000 and whose dispersibility is 10.0 or less, and an organic compound having two or more halogen elements in its molecule.

3. The ethyleneimine polymer solution according to claim 2, wherein an amount of the polyamine compound used in the reaction system is in a range of 0.4 to 40 mass % with respect to 100 mass % of an amount of the ethyleneimine used.

4. The ethyleneimine polymer solution according to claim 2, wherein the reaction system further contains at least one Brønsted acid.

5. The ethyleneimine polymer solution according to claim 4, wherein the organic compound having the halogen elements is a poorly-water-soluble compound having no hydrophilic groups in its molecule.

6. The ethyleneimine polymer solution according to claim 2, wherein the organic compound having the halogen elements is a water-soluble compound having one or more hydrophilic groups in its molecule.

7. The ethyleneimine polymer solution according to claim 2, wherein an amount of the organic compound having the halogen elements used in the reaction system is in a range of 0.8 to 3.0 mass % with respect to 100 mass % of an amount of the ethyleneimine used.

8. The ethyleneimine polymer solution according to claim 2, wherein an amount of the aqueous solvent in the reaction system is in a range of 67 to 400 mass % with respect to 100 mass % of a total amount of the ethyleneimine, the polyamine compound, and the organic compound used.

9. The ethyleneimine polymer solution according to claim 2, wherein a reaction temperature of a polymerization reaction of ethyleneimine in the reaction system is in a range of 50 to 150° C.

10. The ethyleneimine polymer solution according to claim 2, wherein the ethyleneimine polymer polymerized in the reaction system is aged at a temperature in a range of 50 to 150° C.

11. The ethyleneimine polymer solution according to claim 2, wherein a reaction product in a middle of polymerizing the ethyleneimine is aged at a temperature in a range of 50 to 150° C.

12. An adhesion promoter for a laminate, a sludge coagulant, or pulp freeness improver, comprising the ethyleneimine polymer solution according to claim 1.

13. A method for promoting adhesion for a laminate, comprising:
applying the ethyleneimine polymer solution according to claim 1 to a laminate film as an adhesion improver.

14. The method according to claim 13, wherein the ethyleneimine polymer solution is applied to the laminate film in combination with another adhesion improver.

15. A method for water treatment, comprising:
adding the ethyleneimine polymer solution according to claim 1 to a water as a sludge coagulant or a pulp freeness improver.

16. The method according to claim 15, wherein the ethyleneimine polymer solution is added to the water in combination with another sludge coagulant or a pulp freeness improver.

17. The ethyleneimine polymer solution according to claim 2, wherein the polyamine compound is polyethyleneimine.

18. The ethyleneimine polymer solution according to claim 2, wherein the organic compound having the halogen elements is selected from the group consisting of 1,3-dichloro-2-propanol, 2,3-dichloro-1-propanol, 2,3-dichloropropionic acid, dichloroacetic acid, 2,2-dichloropronionic acid, trichloro acetic acid, 1,4-dichloro-1-butanol, 1,4-dichloro-2,3-butanediol, 2,2,2-trichloroethanol, 1,2-dichloroethane, 2,2-dichloropropane, 1,1,2-trichloroethane, 2,2-dichlorobutane, and 1,1,2-trichloropropane.

* * * * *